United States Patent
Simha

(10) Patent No.: US 10,327,216 B2
(45) Date of Patent: Jun. 18, 2019

(54) METHODS AND DEVICES FOR PAGE SYNCHRONIZATION OF A COMMUNICATION SIGNAL

(71) Applicant: Intel IP Corporation, Santa Clara, CA (US)

(72) Inventor: Vinay Simha, Bangalore (IN)

(73) Assignee: INTEL IP CORPORATION, Santa Clara, CA (US)

( * ) Notice: Subject to any disclaimer, the term of this patent is extended or adjusted under 35 U.S.C. 154(b) by 57 days.

(21) Appl. No.: 15/473,743

(22) Filed: Mar. 30, 2017

(65) Prior Publication Data

US 2018/0288719 A1 Oct. 4, 2018

(51) Int. Cl.
| | |
|---|---|
| H04W 4/02 | (2018.01) |
| H04W 56/00 | (2009.01) |
| H04B 7/185 | (2006.01) |
| G01S 19/37 | (2010.01) |
| H04W 88/02 | (2009.01) |

(52) U.S. Cl.
CPC ......... *H04W 56/0025* (2013.01); *G01S 19/37* (2013.01); *H04B 7/185* (2013.01); *H04W 4/02* (2013.01); *H04W 88/02* (2013.01)

(58) Field of Classification Search
CPC ..... H04W 56/0025; H04W 4/02; H04B 7/185
See application file for complete search history.

(56) References Cited

U.S. PATENT DOCUMENTS

| | | | | |
|---|---|---|---|---|
| 5,331,329 A | * | 7/1994 | Volkov | G01S 19/02 342/357.395 |
| 6,836,518 B1 | * | 12/2004 | Sano | H04L 27/2675 375/343 |
| 7,471,241 B1 | | 12/2008 | Yang | |
| 8,385,371 B2 | * | 2/2013 | Matsumoto | H04H 20/74 370/470 |
| 9,100,107 B1 | * | 8/2015 | Kutik | H04B 1/7085 |
| 9,319,096 B1 | * | 4/2016 | Rifkin | H04B 1/70752 |
| 9,379,856 B2 | | 6/2016 | Khoryaev et al. | |
| 2005/0180538 A1 | * | 8/2005 | Karr | H04H 20/34 375/368 |
| 2007/0021122 A1 | * | 1/2007 | Lane | H04B 7/01 455/441 |

(Continued)

FOREIGN PATENT DOCUMENTS

CN 104280751 A 1/2015

OTHER PUBLICATIONS

International Search Report based on International application No. PCT/US2018/021436, dated Jun. 28, 2018, 14 pages (Reference Purpose Only).

*Primary Examiner* — Rasheed Gidado
(74) *Attorney, Agent, or Firm* — Viering, Jentschura & Partner MBB

(57) ABSTRACT

Methods and devices for performing a page synchronization of a communication signal having a page structure with at least one repeating feature, the methods and devices configured to demodulate the communication signal to produce a raw symbol stream; correlate a plurality of subsets of the raw symbol stream with a page synchronization pattern; detect which of the plurality of subsets meet a pre-determined correlation condition; and identify two of the detected subsets based on a characteristic of the at least one repeating feature.

25 Claims, 7 Drawing Sheets

(56) References Cited

U.S. PATENT DOCUMENTS

| | | | | |
|---|---|---|---|---|
| 2007/0147565 A1* | 6/2007 | Akahori | H04L 7/08 375/355 |
| 2009/0141836 A1* | 6/2009 | Shirakata | H04L 27/2662 375/343 |
| 2010/0124175 A1* | 5/2010 | Chang | H04L 7/042 370/250 |
| 2011/0268101 A1* | 11/2011 | Wang | H04L 5/0053 370/344 |
| 2013/0141278 A1* | 6/2013 | Rao | G01S 19/02 342/357.44 |
| 2014/0327574 A1* | 11/2014 | Achanta | G01S 19/215 342/357.59 |
| 2014/0376540 A1* | 12/2014 | Zeng | H04W 56/0005 370/350 |
| 2015/0249966 A1* | 9/2015 | Grelier | G01S 19/02 370/350 |

* cited by examiner

METHODS AND DEVICES FOR PAGE SYNCHRONIZATION OF A COMMUNICATION SIGNAL

TECHNICAL FIELD

Various aspects of this disclosure relate generally to methods and devices for wireless communications.

BACKGROUND

Global navigation satellite system (GNSS) positioning services have become increasingly important for a wide range of applications for determining the geographic location of a user equipment (UE), e.g. a mobile terminal, within a wireless communication network. One of GNSSs available is the Galileo GNSS which aims at providing an independent, high-precision positioning system incapable of being disabled or corrupted by their operators, as is the case with the Russian Global Navigation Satellite System (GLONASS), United States Global Positioning System (GPS) or Chinese Bei Dou systems. An important factor to ensure high-level performance of the Galileo GNSS is an efficient and highly robust page synchronization procedure with the Galileo receiver.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

Figure 1:
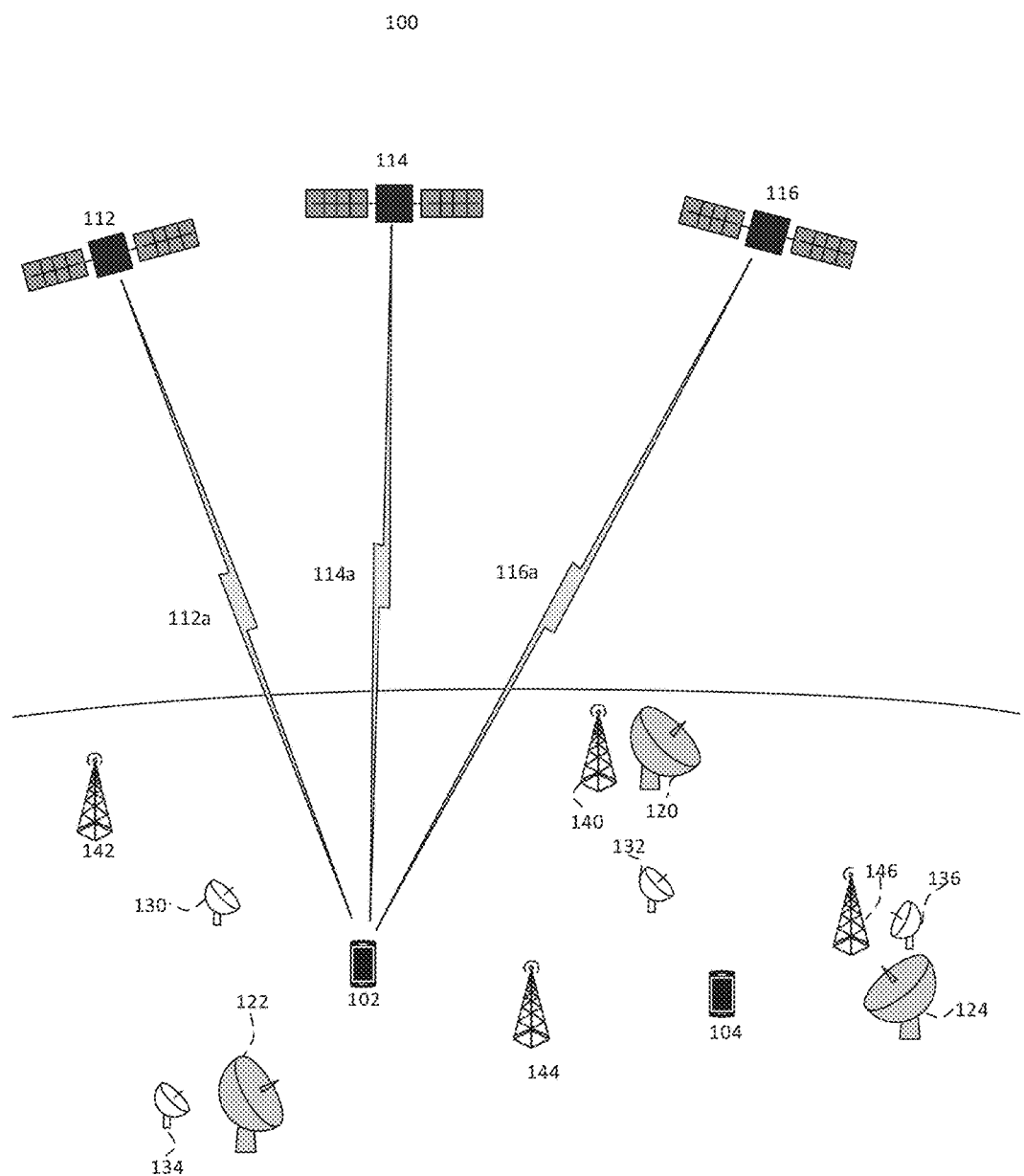
FIG. 1 shows a global navigation satellite system (GNSS) architecture.

The following details description refers to the accompanying drawings that show, by way of illustration, specific details and aspects in which the invention may be practiced.

The word "exemplary" is used herein to mean "serving as an example, instance, or illustration". Any aspect or design described herein as "exemplary" is not necessarily to be construed as preferred or advantageous over other aspects or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" or "circuitry" may refer to a single circuit, a collection of circuits, and/or an electronic device composed of one or more circuits.

A "processing circuit" (or equivalently "processing circuitry" or "processer") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

The term "network" as utilized herein, e.g. in reference to a communication network such as a mobile communication network or global navigation satellite system network, is intended to encompass both an access component of a network (e.g. a radio access network (RAN) component) and a core component of a network (e.g. a core network component).

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions. The term "calculate" encompasses both 'direct' calculations via a mathematical expression/formula/relationship and 'indirect' calculations via lookup tables and other array indexing or searching operations.

It is understood that exemplary scenarios detailed herein are demonstrative in nature, and accordingly may be similarly applied to various other communication technologies, both existing and not yet formulated, particularly in cases where such communication technologies share similar features as disclosed regarding the following examples.

The GNSS signal processing methods and devices of this disclosure efficiently perform page synchronization of Galileo navigation data, e.g. the integrity navigation message (I/NAV), as demodulated from the Galileo signal, e.g. the Galileo E1B signal. The page synchronization is a vital aspect of GNSS services as it is needed in both acquisition and tracking stages of GNSS reception. It is also the first step in I/NAV data processing, which gates the subsequent de-interleaving and Viterbi decoding process. During the acquisition, page synchronization has a direct impact on the 'time-to-first-fix' (TTFF) using Galileo satellite signals. During tracking, page synchronization has a direct impact on keeping the bit errors low, especially in low signal-to-noise ratio (SNR) conditions.

The disclosure herein provides an efficient implementation by which to detect and track, with a high probability, a short pattern (e.g. the page synchronization pattern) in a stream of the differentially demodulated bits at the receiver side. This implementation is of particular importance to signal structures, e.g. the Galileo E1B signal, which have a short synchronization pattern in order to maximize the amount of bits available for data transmission. By properly and efficiently identifying the page synchronization pattern, the receiver side is able to ascertain the page boundaries of the signal. Further, the receiver may detect the polarity of the received pattern in order to ensure proper Viterbi decoding of the demodulated bits.

FIG. 1 shows a GNSS architecture 100. It is appreciated that GNSS architecture 100 is exemplary in nature and may thus be simplified for purposes of this explanation.

While the ensuing disclosure herein relates particularly to Galileo GNSS, it is appreciated that the methods and devices disclosed herein are applicable to any other communication systems with a similar signal structure, i.e. signals having a page structure with at least one repeating feature, e.g. a short, page synchronization pattern.

The Galileo GNSS system includes a space segment 112-116, a control (i.e. ground) segment 120-146 and a user segment 102-104.

The space segment includes the satellite constellation composed of satellites 112-116 (only three are shown for purposes of this explanation) and is responsible for generating and transmitting the code multiplexed GNSS signal, modulated by the navigation information uploaded by the control segment. The space segment is formed by a satellite constellation arranged in a manner which enables members of the user segment to be in contact with at least seven satellites from any geographic location at any given time. Furthermore, due to the inter-operability of GNSS receivers, the space segment may also include satellites from other GNSS services, e.g. global positioning system (GPS).

At full capacity, the Galileo satellite constellation will include 30 satellites in orbit at an orbital altitude of 23,222 km on three orbital planes. Each orbital plane will include 10 satellites inclined at an angle of 56° to equator, and each satellite will take approximately 14 hours to orbit the Earth.

The control segment 120-146 is responsible for the operation of the GNSS, including controlling the satellite constellation, monitoring its status and updating the navigation messages for the satellites. In the Galileo GNSS, this includes the generation of the Galileo uplink signals, i.e. the data required by the Galileo navigation downlink signals to the user segment. The Galileo GNSS control segment is composed of a network of two ground control centers (not pictured); five Telemetry, Tracking, and Control (TT&C) stations (e.g. 120-124, only three shown); nine Mission Uplink stations (e.g. 130-136, only four shown), and a world-wide network of Galileo Sensor Stations (e.g. 140-146).

The two ground control centers provide the TT&C stations 120-124 with the Telemetry, Tracking, and Control data for satellite constellation control. The control segment is also responsible for determining and up-linking to the satellites the navigation and integrity data (e.g. I/NAV) used in broadcasting the navigation signals from the satellites to the user segment. Mission Uplink stations 130-136 transmit these messages from the ground control centers to the satellites 112-116.

The user segment includes the GNSS receivers, such as UEs 102 and 104. Their main function is to receive the GNSS downlink navigation signals from the satellites 112-116 and to compute navigational calculations in order to obtain location coordinates.

The Galileo satellites 112-116 continuously transmit Galileo navigation signals, e.g. 112a-116a, to the user segment 102-104 at four frequencies in the L-band: the E1 signal centered at 1575.42 MHz (i.e. in the upper L-Band); the E5a and E5b signals centered at 1176.45 MHz and 1207.14 MHz, respectively (i.e. both in the lower L-band); and the E6 signal centered at 1278.75 MHz (i.e. in the lower L-band). Each of the signals may be modulated by one of three methods: A, B, and C, corresponding to the type of signal which is being transmitted, i.e. data, pilot, or a Public Regulated Service (PRS) signal. For example, the E1B component, centered at 1575.42 MHz, is the E1 data signal and bears the Integrity Navigation Message (I/NAV) message. The I/NAV message is essential to providing the Galileo receivers in the user segment with accurate orbital information from the satellites.

Figure 2:
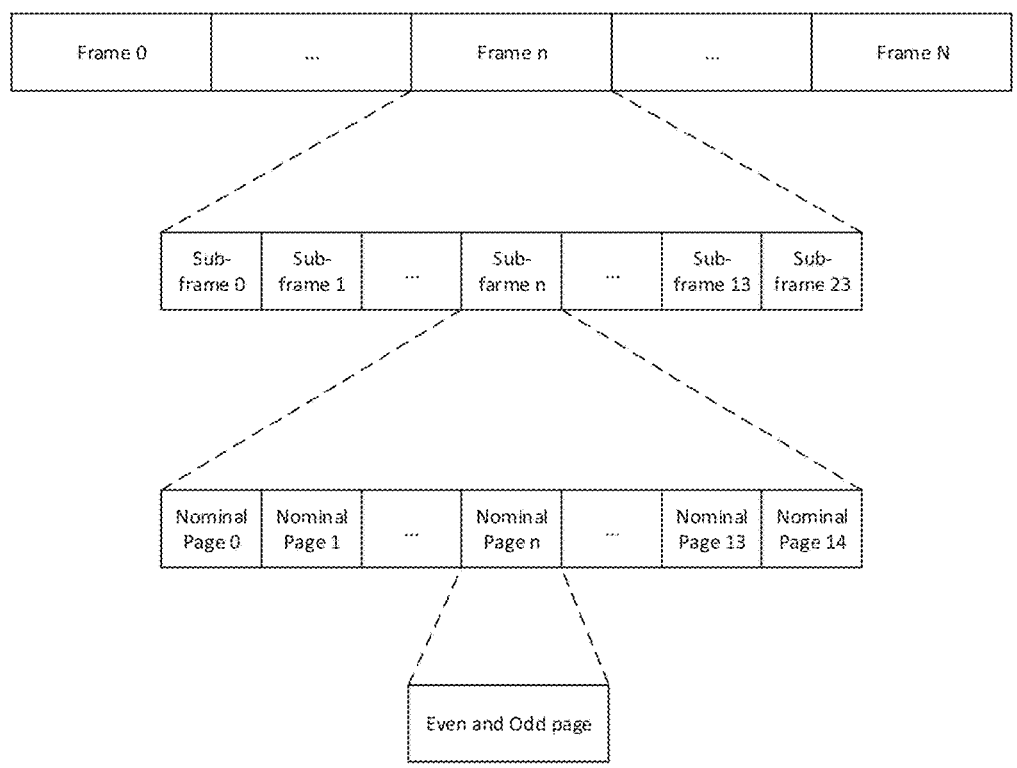
FIG. 2 shows a Galileo frame structure.

FIG. 2 is a frame structure 200 depicting the Galileo I/NAV message format. This message format is broadcast on the E1B signal and the E5B signal in the Galileo GNSS. It is appreciated that frame structure 200 is exemplary in nature and may therefore be simplified for purposes of this explanation.

The complete navigation message data is transmitted as a sequence of frames (Frame 0 . . . Frame N). In the I/NAV message format, each one of these frames is 720 seconds in duration and composed of 24 sub-frames (i.e. subframe 0 , . . . , subframe 23). Each of these subframes is 30 seconds in duration, and is further composed of fifteen nominal pages (i.e. page 0, . . . , page 14). Each nominal page is two seconds in duration and includes an even and an odd page of one second in duration each.

Nominal pages have a duration of two seconds and include two parts (even or odd) of one second duration each which are transmitted sequentially. The first part is denoted as the even part and the second part is denoted as the odd part. The I/NAV message page part (even or odd) is shown at the tables at the bottom of FIG. 2, and depicts the symbol and bit allocation for each. The 240 symbols are derived from the 120 navigation data bits by passing the navigation data bits through a Forward Error Correction (FEC) encoder and a Block Interleaver. The FEC convolutional encoding is performed according to the following coding parameters: a coding rate of 1/2, a constraint length of 7, and generator polynomials G1=171o and G2=133o with an encoding sequence of G1 then G2. For the I/NAV message type, the block interleaver size is 240 symbols with block interleaver dimensions of 30×8. For the Freely Accessible Navigation (F/NAV) message type, the block interleaver size is 488 symbols with block interleaver dimensions of 61×8.

Each I/NAV page starts with a 10 symbol synchronization pattern configured to facilitate receiver synchronization with the page boundary. The synchronization pattern in the I/NAV page is '0101100000.' Since the synchronization pattern is only 10 symbols out of the 250 symbols received per page per second, there may be multiple detected patterns within the page (i.e. not the page synchronization pattern, i.e. not the page boundaries) which are false candidates for the page boundary. The methods and devices of this disclosure facilitate the detection of the true page boundaries in the shortest amount of time possible for the subsequent steps of de-interleaving and Viterbi decoding.

While the disclosure herein focuses on page synchronization methods of the I/NAV message in the Galileo E1B or E5B signal, the methods and devices of this disclosure may also be applied to page synchronization signal processing for all similar page structures, e.g. signals with relatively short page synchronization patterns compared to message page lengths. For example, in the F/NAV structure in the Galileo E5A signal, the page synchronization pattern is only 12 bits ('101101110000') with an F/NAV Page Part of 238 bits and a tail of 6 bits. Accordingly, the page synchronization methods and devices of this disclosure may be applied to page synchronization with the F/NAV message. Of course, since the page lengths differ from that of the I/NAV message, some of the critical parameters may be adjusted to fit the appropriate application (e.g. the pre-determined time gap between timestamped peaks will be different due to different page lengths, a different correlation threshold may be used, etc.).

Figure 3:
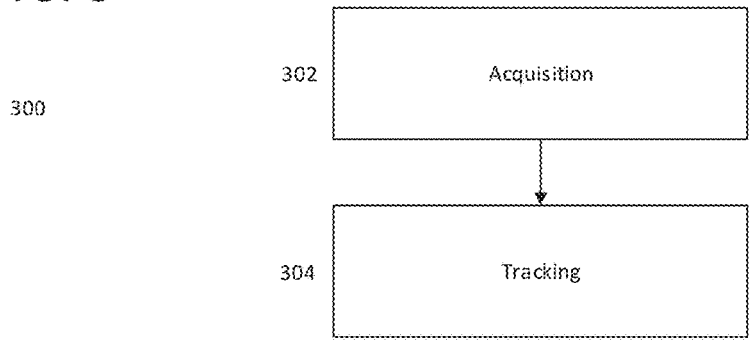
FIG. 3 shows a flowchart describing stages of GNSS signal reception during which the devices and methods of this disclosure may be applied.

FIG. 3 is a flowchart 300 describing a page synchronization method of an aspect of this disclosure. It is appreciated that flowchart 300 is exemplary in nature and may thus be simplified for purposes of this explanation.

The GNSS receiver first acquires the GNSS signal from each satellite in the proper frequency and coding domain 302. When the GNSS receiver is turned on (e.g. UE 102 is powered on), a GNSS signal from each satellite must be acquired before the receiver is able to access information from each of the signals and use this information to ascertain geographic information to implement in a navigation procedure. This process may include determining which satellites are visible, determining the approximate Doppler effect of each satellite, and searching for the signal in both the proper code and frequency domain. Once the signal is detected, the code and the carrier frequency is used in tracking 304.

The GNSS receiver, e.g. UE 102, determines visible satellites and their corresponding Doppler shifts using approximate time and receiver positions, as well as satellite position and velocity data, stored in a memory component accessible by the receiver. By readily accessing this data, the GNSS receiver is more able to readily establish a search region for the GNSS signal frequency.

Once the satellites and corresponding Doppler have been identified, the GNSS receiver searches for the GNSS signal from each satellite in both the code and frequency domain. The code search is necessary because the receiver has no knowledge of the GNSS system time, without which it cannot trigger the correlation at the start of the pseudorandom noise (PN) code. There is a time ambiguity in the PN code interval (e.g. 4 ms), which needs to be resolved before the PN code can be de-spread and further processing can take place. The receiver, therefore, must process the signal to a narrower bandwidth by precisely aligning a template code stored on its device with the received signal. A proper search of all positions is required to ensure proper synchronization in order to be able to detect the GNSS signal. The receiver performs a search over sufficiently close grid points in the two dimensional code and frequency uncertainty range. At each grid point, the receiver despreads the signal with the candidate code phase and frequency. This is followed by integrating (averaging) the signal both coherently and non-coherently. At one of the grid points (one closest to the real code phase & frequency), we observe a SNR that is high enough for reliable detection. The code phase & frequency of this grid point is used to seed the tracking process, which further continues to track them over time.

Once the signal has been detected and acquired, the GNSS receiver uses code and frequency tracking 304 to maintain proper alignment with the received GNSS signals, e.g. to keep the receiver tuned to the proper frequency and code offset in response to user and/or satellite movement.

Figure 4:
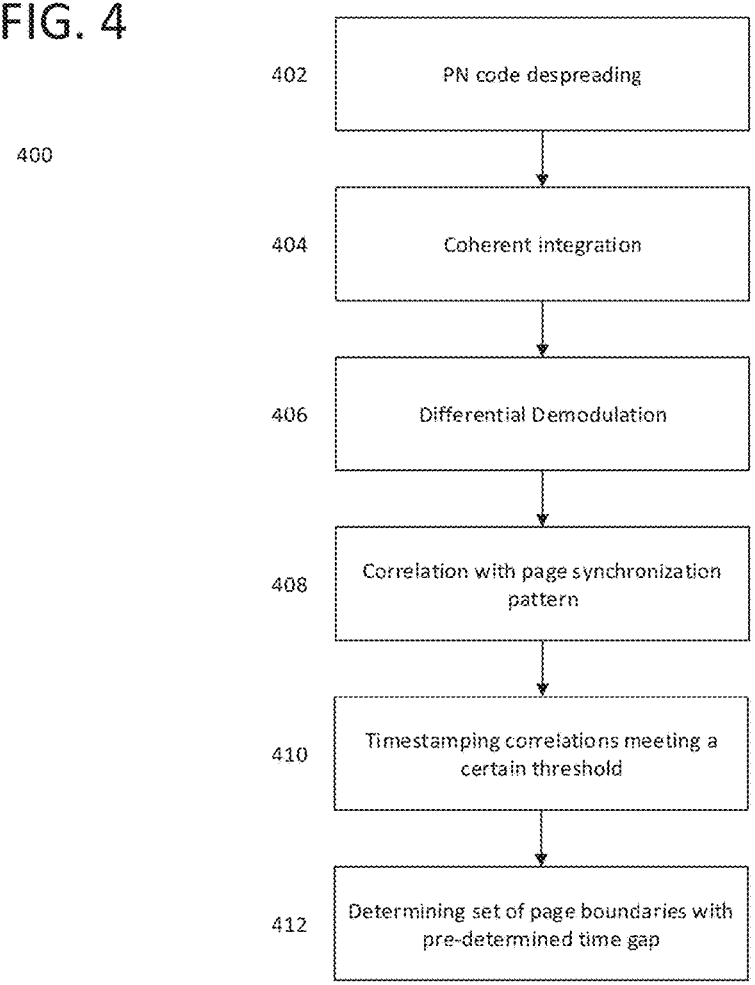
FIG. 4 shows a flowchart describing a page synchronization method.

FIG. 4 is a flowchart 400 describing a page synchronization method to use in at least one of the acquisition and/or tracking stages of GNSS signal reception. It is appreciated that flowchart 400 is exemplary in nature and may thus be simplified for purposes of this explanation.

As described in FIG. 2, the page synchronization pattern for certain GNSS signals consists of a very short length when compared to the amount of symbols received per page per second. For the Galileo I/NAV signal in E1B, the page synchronization pattern '0101100000', for example, consists of 10 symbols, considerably less than the number of symbols when compared to the 250 symbols received per page per second in the I/NAV message format. A similar scenario is found in other Galileo signals (and signal components) which may use the I/NAV message structure or for Galileo signals using the F/NAV message structure.

During the initial acquisition of the symbol stream, there may be a number of falsely detected page boundary patterns attributable to the short page synchronization pattern length and the fact that the pattern is not particularly unique. However, the true page boundary must be identified and the receiver must synchronize itself to the received Galileo E1B signal in the shortest time possible in order to proceed to the ensuing steps of de-interleaving and Viterbi decoding of the Galileo E1B signal. The devices disclosed herein implement an efficient and accurate method to achieve fast page synchronization in Galileo E1B signal processing.

When a GNSS receiver acquires a Galileo signal from a satellite and starts to track it, the signal may first be subject to a PN code despreading 402 followed by coherent integration 404.

Afterwards, the GNSS receiver (e.g. UE) applies a differential demodulation 406 to produce a raw data stream. After the raw data stream is obtained, the 'page start point,' or 'page boundary,' is located by correlating the raw data stream with the page synchronization pattern 408. The short page synchronization pattern is less likely to be unique and may be found randomly in the payload data, which will cause correlations of comparable magnitude with that of the true page sync pattern. Also, because the differential demodulation does not correct the polarity of the received symbols, the correlation can be either positive or negative.

In order to overcome this ambiguity of where the 'page start point' is, all candidate start points are timestamped 410 with corresponding values of a free-running counter driven by a real time clock (RTC). In other words, all correlations meeting a certain threshold value are timestamped. In the case of the E1B page synchronization pattern, this may be, for example, where 7 (or 8, or 9) out of the 10 symbols correlate to the page synchronization pattern, e.g. a correlation of 0.7 in the case the polarity of the symbols is positive after the differential demodulation, or −0.7 if the symbols are negative. The RTC count should have a resolution smaller than the bit period. For example, in the case of page synchronization of the Galileo E1B component, which has a bit period of 4 ms, an RTC count resolution may be about 1 ms.

After collecting a history of these timestamps for a few seconds, e.g. about 2-3 seconds may be sufficient for Galileo E1B, the true set of page boundaries is determined by selecting those timestamps which are a predetermined amount of time apart from each other 412. In the case of Galileo E1B page synchronization, the pre-determined amount of time is 1 second, i.e. the length of one page part.

After the page boundaries are determined, the polarity of the page synchronization pattern correlations are inspected and if negative, a sign reversal is applied to the symbol stream. The symbols may be further processed, e.g. de-interleaved and decoded in a Viterbi decoder, in accordance with GNSS signal processing procedures.

It should be noted that even a single bit error in the differential demodulation may cause a polarity reversal in the correlation for the rest of the page. If not accounted for, a single bit error (anywhere in the middle of the page), will lead to a complete breakdown in the Viterbi decoding process. It will not be detected until the next page boundary, where we would observe that the page synchronization pattern is negatively correlated. These bit errors are common in the tracking of weak GNSS signals. In order to facilitate the recovery from these errors, the page synchronization methods of this disclosure are implemented to run in parallel to the Viterbi decoding process in order to ensure that both the page is synchronized and the proper polarity correction is applied to the symbols before presenting them to the Viterbi decoder.

Figure 5:
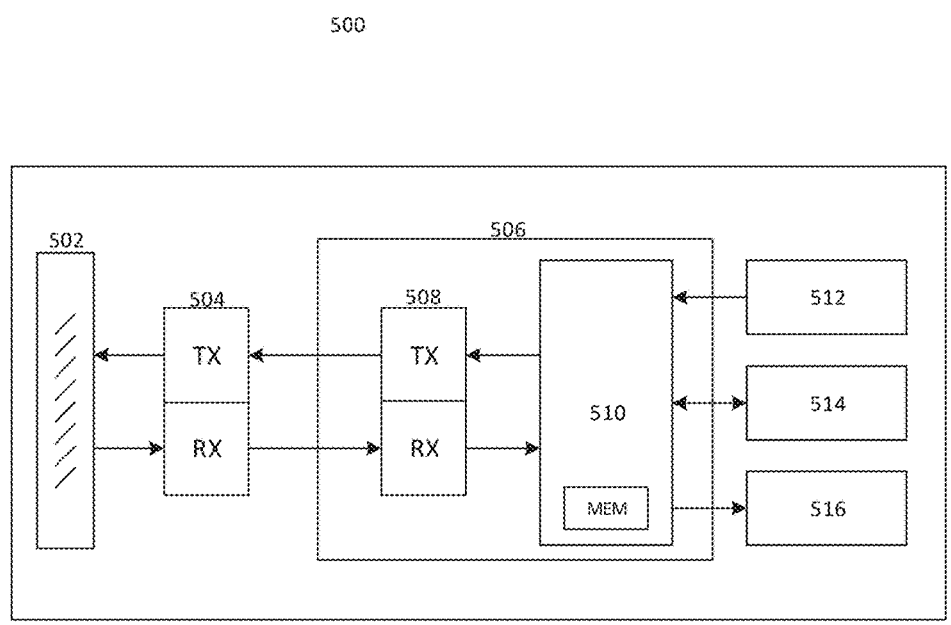
FIG. 5 shows an internal configuration of a user equipment (UE)

FIG. 5 shows an internal configuration of a UE 500, which may be configured to perform the page synchronization methods of this disclosure. As shown in FIG. 5, UE 500 may include antenna system 502, radio frequency (RF) transceiver 504, baseband modem 506 (including physical layer processing circuit 508 and controller 510), data source 512, memory 514, and data sink 516. Although not explicitly shown in FIG. 5, UE 500 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), user input/output devices (display(s), keypad(s), touchscreen(s), speaker(s), external button(s), camera(s), microphone(s), etc.), etc.

In an abridged operational overview, UE 500 may transmit and receive radio signals on one or more radio access network (RANs), e.g. an LTE RAN, and/or one or more GNSS networks, e.g. Galileo GNSS. It is appreciated that GNSS is a receive (Rx) only chain, and therefore the transmit (Tx) components may not be required to implement the methods and/or algorithms of this disclosure. However, Tx components are demonstrated in the UE 500 for purposes of applying the disclosure herein to a device such as a cellular phone or any other device capable of receiving and transmitting signals on multiple RANs.

Baseband modem 506 may direct such communication functionality of UE 500 according to the communication protocols associated with each RAN and/or GNSS, and may execute control over antenna system 502 and RF transceiver 504 in order to transmit and receive radio signals according to the formatting and scheduling parameters defined by each communication protocol. For example, with respect to a GNSS communication protocol (e.g. Galileo communications), baseband modem 506 may be configured to direct the GNSS (e.g. Galileo) reception circuitry according to the disclosure herein.

UE 500 may transmit and receive radio signals with antenna system 502, which may be a single antenna or an antenna array composed of multiple antennas and may additionally include analog antenna combination and/or beamforming circuitry. The receive path (RX) of RF transceiver 504 may receive analog radio frequency signals from antenna system 502 and perform analog and digital RF front-end processing on the analog radio frequency signals to produce digital baseband samples (e.g. In-Phase/Quadrature (IQ) samples) to provide to baseband modem 506. RF transceiver 504 may accordingly include analog and digital reception circuitry including amplifiers (e.g. a Low Noise Amplifier (LNA), filters, RF demodulators (e.g. an RF IQ demodulator)), and analog-to-digital converters (ADCs) to convert the received radio frequency signals to digital baseband samples. In the transmit path (TX), RF transceiver 504 may receive digital baseband samples from baseband modem 506 and perform analog and digital RF front-end processing on the digital baseband samples to produce analog radio frequency signals to provide to antenna system 502 for wireless transmission. RF transceiver 504 may thus include analog and digital transmission circuitry including amplifiers (e.g. a Power Amplifier (PA), filters, RF modulators (e.g. an RF IQ modulator), and digital-to-analog converters (DACs) to mix the digital baseband samples received from baseband modem 506 to produce the analog radio frequency signals for wireless transmission by antenna system 502. Baseband modem 506 may control the RF transmission and reception of RF transceiver 504, including specifying transmit and receive radio frequencies for operation of RF transceiver 504.

As shown in FIG. 5, baseband modem 506 may include physical layer processing circuit 508, which may perform physical layer (i.e. Layer 1) transmission and reception processing to prepare outgoing transmit data provided by controller 510 for transmission via RF transceiver 504 and prepare incoming received data provided by RF transceiver 504 for processing by controller 510. Physical layer processing circuit 508 may accordingly perform one or more of channel estimation, adaptive filtering, error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Physical layer processing circuit 508 may be structurally realized as hardware logic, e.g. as an integrated circuit or FPGA, as software logic, e.g. as program code defining arithmetic, control, and I/O instructions stored in a non-transitory computer-readable storage medium and executed on a processor, or as a combination of hardware and software logic. Although not explicitly shown in FIG. 5, physical layer processing circuit 508 may include a control circuit such as a processor configured to control the various hardware and software processing components of physical layer processing circuit 508 in accordance with physical layer control logic defined by the communications protocol for the relevant radio access technologies (RATs). Furthermore, while physical layer processing circuit 508 is depicted as a single component in FIG. 5, physical layer processing circuit 508 may be collectively composed in separate sections of physical layer processing circuitry where each respective section is dedicated to the physical layer processing of a particular RAT.

Physical layer processing circuit 508 may include hardware and/or software to implement the GNSS page synchronization methods of this disclosure.

UE 500 may be configured to operate according to one or more RATs (including GNSS technologies), which may be directed by controller 510. Controller 510 may thus be responsible for controlling the radio communication components of UE 500 (antenna system 502, RF transceiver 504, and physical layer processing circuit 508) in accordance with the communication protocols of each supported RAT, and accordingly may represent the Access Stratum (AS) and Non-Access Stratum (NAS) (also encompassing Layer 2 and Layer 3) of each supported RAT. Controller 510 may be structurally embodied as a protocol processor configured to execute protocol software (retrieved from controller memory MEM as shown in FIG. 5) and subsequently control the radio communication components of UE 500 in order to transmit and receive communication signals in accordance with the corresponding protocol control logic defined in the protocol software.

Controller 510 may therefore be configured to manage the radio communication functionality of UE 500 in order to communicate with the various radio and core network components of a Global navigation network (e.g. Galileo), and accordingly may be configured according to the communication protocols for one or more RAT networks. Controller 510 may either be a unified controller that is collectively responsible for all supported RATs (e.g. Galileo, GPS, LTE, GSM/UMTS, etc.) or may be composed of multiple separate controllers where each controller is a dedicated controller for a particular RAT, such as e.g. a dedicated LTE controller and a dedicated legacy controller (or alternatively a dedicated LTE controller, dedicated GSM controller, and a dedicated UMTS controller). Regardless, controller 510 may be responsible for directing radio communication activity of UE 500 according to the communication protocols of the RAT networks. As previously noted regarding physical layer processing circuit 508, one or both of antenna system 502 and RF transceiver 504 may similarly be partitioned into multiple dedicated components that each respectively correspond to one or more of the supported RATs. Depending on the specifics of each such configuration and the number of supported RATs, controller 510 may be configured to control the radio communication operations of UE 500 in accordance with a master/slave RAT hierarchical or multi-SIM scheme.

UE 500 may further comprise data source 512, memory 514, and data sink 516, where data source 512 may include sources of communication data above controller 510 (i.e. above the NAS/Layer 3) and data sink 516 may include destinations of communication data above controller 510 (i.e. above the NAS/Layer 3). Such may include, for example, an application processor of UE 500, which may be configured to execute various applications and/or programs of UE 500 at an application layer of UE 500, such as e.g. an Operating System (OS), a User Interface (UI) for supporting user interaction with UE 500, and/or various user applications. The application processor may interface with baseband modem 506 (as data source 512/data sink 516) as an application layer to transmit and receive user data such as voice data, audio/video/image data, messaging data, application data, basic Internet/web access data, etc., over a the radio network connection(s) provided by baseband modem 506. Data source 512 and data sink 516 may additionally represent various user input/output devices of UE 500, such as display(s), keypad(s), touchscreen(s), speaker(s), external button(s), camera(s), microphone(s), etc., which may allow a user of UE 500 to control various communication functions of UE 500 associated with user data.

Memory 514 may include a memory component of UE 500, such as e.g. a hard drive or another such permanent memory device. Although not explicitly depicted in FIG. 3, the various other components of UE 500 shown in FIG. 5 may additionally each include integrated permanent and non-permanent memory components, such as for storing software program code, buffering data, etc.

Figure 6:
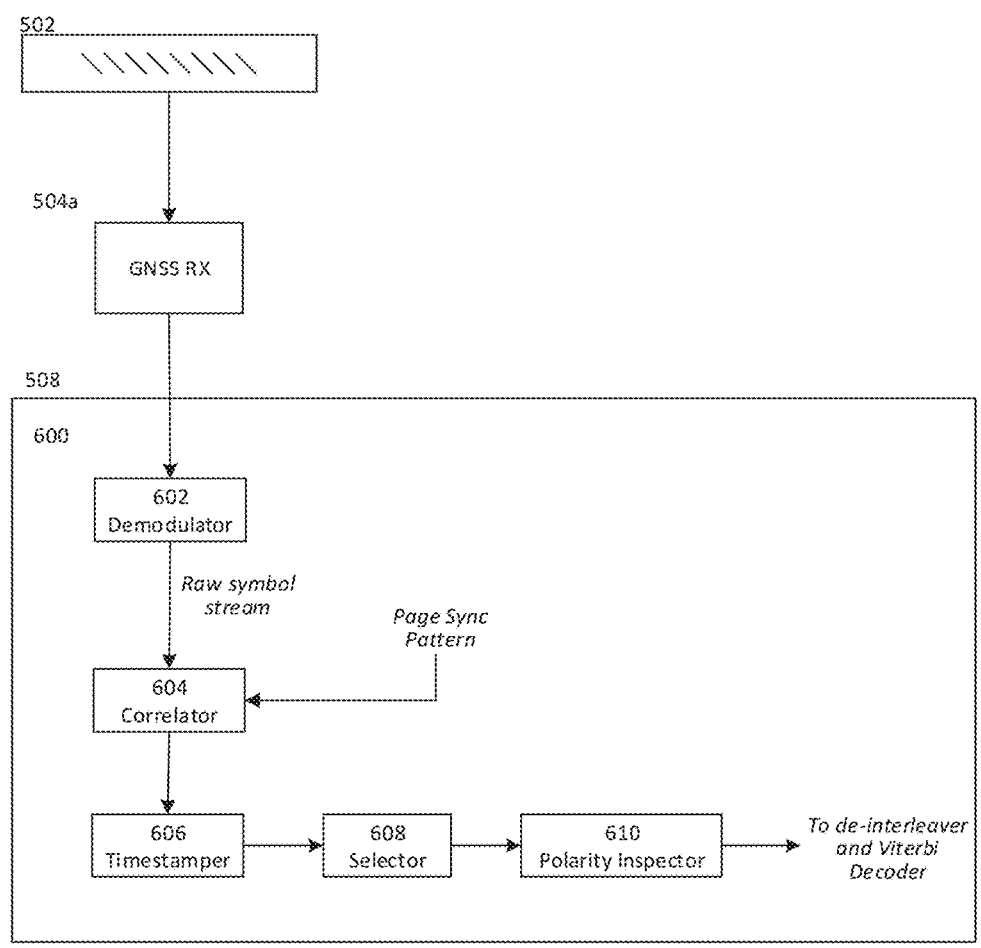
FIG. 6 shows a configuration for the GNSS signal processing circuitry.

FIG. 6 shows a circuit configuration 600 configured to implement the page synchronization methods of this disclosure. It is appreciated that circuit configuration 600 is exemplary in nature and may thus be simplified for purposes of this explanation. Accordingly, the illustrated configuration of FIG. 6 may omit certain components of a mobile device that are not directly related to the GNSS page synchronization procedure (e.g. such as transmit circuitry) in addition to control, power, and clock lines.

GNSS Reception circuity 504a may be included within the Tx/Rx 504 in FIG. 5 and is configured to receive GNSS-specific signals, e.g. Galileo signals, for further processing.

Physical layer processing circuit 508 may include GNSS page synchronization circuitry 600, which may include demodulation circuitry 602, correlation circuitry 604, marker (i.e. timestamper) circuitry 606, selector circuitry 608, and polarity inspection circuitry 610. Each of the aforementioned components of GNSS page synchronization circuitry 600 may be structurally realized as hardware logic, e.g. as one or more integrated circuits or FPGAs, as software logic, e.g. as one or more processors executing program code that defining arithmetic, control, and I/O instructions stored in a non-transitory computer-readable storage medium, or as a combination of hardware and software logic. Skilled persons will appreciate the possibility to embody each component of GNSS page synchronization circuitry 600 in software and/or software according to the functionality detailed herein.

As detailed in an aspect of this disclosure, GNSS page synchronization circuitry 600 may be a circuit arrangement comprising a demodulation circuitry, e.g. demodulator 602, configured to differentially demodulate a received GNSS signal to produce a raw symbol stream; a correlation circuit, e.g. correlator 604, configured to correlate the raw symbol stream with a page synchronization pattern; a marker circuit, e.g. timestamper 606, configured to timestamp correlations meeting/exceeding a pre-determined correlation threshold and configured to be driven by a real-time clock (RTC); selection circuitry, e.g. selector 608, configured to collect the history of the timestamps for a time period and determine the page boundaries by selecting the timestamped correlations with a pre-determined time gap between on another (i.e. time gap dependent on the known page duration of the processed signal); and polarity inspection circuitry, e.g. polarity inspector 610, configured to inspect the polarity of the page synchronization pattern correlations and apply a sign reversal to the symbol stream if the correlation is found to be negative.

Although not explicitly shown, GNSS page synchronization circuitry 600 may further include pseudorandom noise (PN) dispreading circuitry (i.e. a PN dispreading circuit) for dispreading the PN code and coherent integration circuitry (i.e. a coherent integration circuit) for processing the received GNSS signal prior to demodulation circuit 602.

Although not explicitly shown, GNSS page synchronization circuitry 600 may further include de-interleaver circuitry configured to de-interleave the bit stream and a Viterbi decoder configured to decode the de-interleaved bit stream using the appropriate convolutional code.

Figure 7:
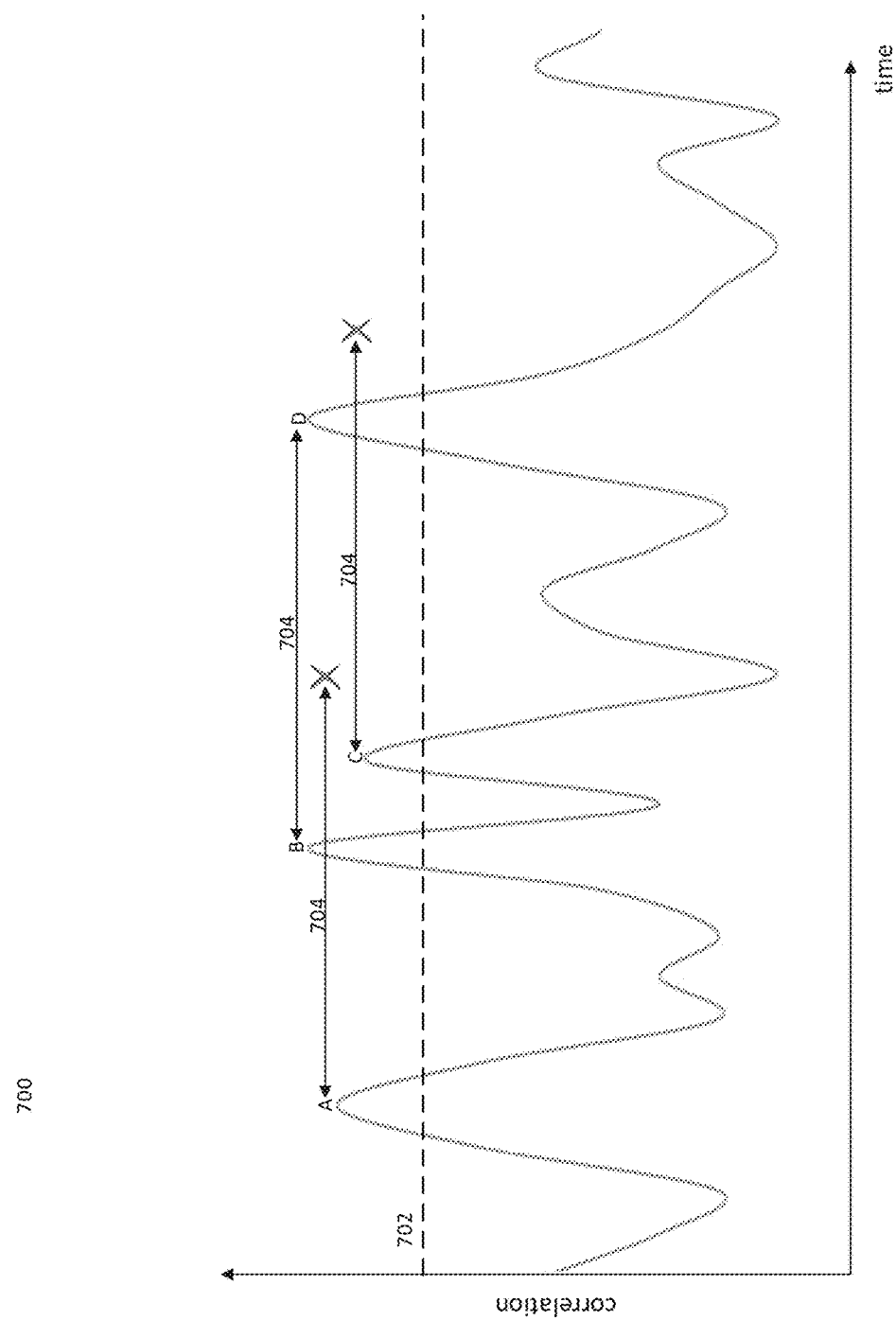
FIG. 7 shows a representative output of correlation of signal with a local replica of a page synchronization pattern in an aspect of this disclosure.

FIG. 7 shows a graph 700 illustrating a component of the GNSS page synchronization method of this disclosure. It is appreciated that FIG. 7 is exemplary in nature and may thus be simplified for purposes of this explanation.

The x-axis of graph 700 represents the time domain and the y-axis represents the correlation of the demodulated raw symbol stream with the page synchronization pattern. Dashed line 702 represents the correlation threshold, i.e. all peaks surpassing this threshold are timestamped as possible page 'start points,' i.e. peaks A, B, C, and D are timestamped by a component of the signal processing circuitry because they exceed the correlation threshold 702. The true page boundaries are determined from these timestamped peaks (A,B, C, and D) by analyzing their respective timestamps to determine which peaks are at certain time (i.e. a pre-determined time gap) from one another. This pre-determined time gap is illustrated by time frames 704. By this analysis, peaks A and C may be discarded as 'false start points' since neither of them have a corresponding peak at the pre-determined amount of time from their own peak, as shown by the lack of a timestamped correlation peak at a time frame 704 from peak A and peak C. Peaks B and D can be identified as being the true page boundaries since their correlation peaks are at the time 704 from one another.

Graph 700 shows a positive correlation scenario, but it is appreciated that a similar approach is taken if the correlation is negative. After determining the page boundaries from the "peaks" (or in the case of negative correlation values, 'valleys,' where the timestamped valleys are those valleys that fall beneath a negative correlation threshold) with the pre-determined time gap between them, the polarity inspector may apply a sign reversal to the symbol stream for further signal processing.

Figure 8:
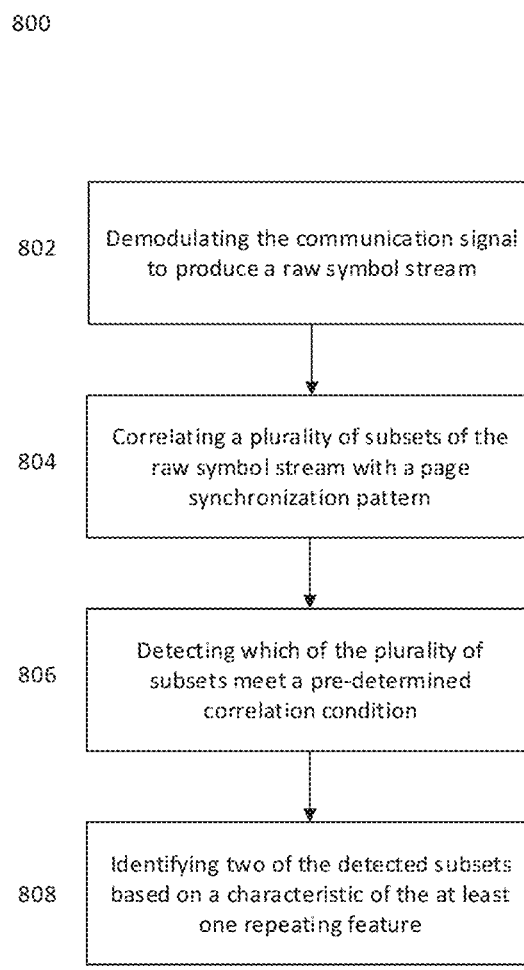
FIG. 8 shows a flowchart describing a page synchronization method for a communication signal having at least one repetitive feature.

FIG. 8 shows a flowchart 800 describing a method for page synchronization in an aspect of this disclosure. It is appreciated that flowchart 800 is exemplary in nature and may be simplified for purposes of this explanation.

The method shown by flowchart 800 may be implemented at the receiver side of any communication signal having a page structure with at least one repetitive feature, e.g. the page synchronization pattern and structure in the Galileo E1B signal.

In 802, the communication signal received at the receiver is demodulated to produce a raw symbol stream. In 804, a plurality of subsets of the raw symbol stream is correlated with a page synchronization pattern. This correlation may comprise correlating the page synchronization pattern in a sliding manner (i.e. moving it along, bit-by-bit) along the raw symbol stream. In 806, certain subsets of the plurality of subsets which meet a pre-determined correlation condition are identified. For example, the correlation condition may be identifying the subsets which meet or exceed a correlation threshold. In another example, the correlation condition may be identifying a pair of the two most closely correlated subsets. In 808, two of the detected subsets (from 806) are identified based on a characteristic of the at least one repeating feature. The two identified subsets are used to determine the page boundaries in the page synchronization of the communication signal.

In Example 1, a method for a communication device to perform a page synchronization of a communication signal having a page structure with at least one repeating feature, the method including: demodulating the communication signal to produce a raw symbol stream; correlating a plurality of subsets of the raw symbol stream with a page synchronization pattern; detecting which of the plurality of subsets meet a pre-determined correlation condition; and identifying two of the detected subsets based on a characteristic of the at least one repeating feature.

In Example 2, the subject matter of Example 1 may include wherein the characteristic is based on a time period between the repeating features.

In Example 3, the subject matter of Example 2 may include wherein the characteristic is a multiple of the time period, wherein the multiple is an integer greater than or equal to one.

In Example 4, the subject matter of Examples 1-3 may include wherein the communication signal is a Global Navigation Satellite System (GNSS) signal.

In Example 5, the subject matter of Example 4 may include acquiring the GNSS signal in a frequency domain and code domain.

In Example 6, the subject matter of Examples 4-5 may include wherein the GNSS signal is a Galileo satellite signal.

In Example 7, the subject matter of Example 6 may include wherein the Galileo satellite signal is an E1B signal.

In Example 8, the subject matter of Example 7 may include wherein the E1B signal comprises an Integrity Navigation Message (I/NAV).

In Example 9, the subject matter of Example 8 may include wherein the page synchronization pattern comprises a 10 bit sequence.

In Example 10, the subject matter of Example 9 may include wherein the 10 bit sequence is '0 1 0 1 1 0 0 0 0 0.'

In Example 11, the subject matter of Examples 1-10 may include storing the page synchronization pattern in a memory component of the communication device.

In Example 12, the subject matter of Examples 1-11 may include wherein the pre-determined correlation condition is a correlation threshold.

In Example 13, the subject matter of Example 12 may include wherein the correlation threshold comprises a value indicating a high correlation with the page synchronization pattern.

In Example 14, the subject matter of Examples 1-13 may include timestamping the detected subsets which meet the pre-determined correlation condition.

In Example 15, the subject matter of Example 14 may include driving a free running counter by a real time clock.

In Example 16, the subject matter of Example 15 may include wherein the timestamping comprises marking the detected subsets with a corresponding value of the free running counter.

In Example 17, the subject matter of Examples 15-16 may include wherein the real time clock has a resolution smaller than a bit period of the page structure.

In Example 18, the subject matter of Example 17 may include wherein the resolution is smaller than about 4 milliseconds.

In Example 19, the subject matter of Examples 14-18 may include collecting the timestamps for a time period.

In Example 20, the subject matter of Example 19 may include wherein the time period is at least about two seconds.

In Example 21, the subject matter of Examples 1-20 may include inspecting a polarity of the correlations of the two identified detected subsets.

In Example 22, the subject matter of Example 21 may include wherein when the polarity is negative, further comprising applying a sign reversal to the raw symbol stream.

In Example 23, the subject matter of Examples 21-22 may include de-interleaving the raw symbol stream.

In Example 24, the subject matter of Example 23 may include decoding the de-interleaved symbol stream with a Viterbi decoder.

In Example 25, a circuitry for performing a page synchronization of a communication signal having a page structure with at least one repeating feature, the circuitry configured to: demodulate the communication signal to produce a raw symbol stream; correlate a plurality of subsets of the raw symbol stream with a page synchronization pattern; detect which of the plurality of subsets meet a pre-determined correlation condition; and identify two of the detected subsets based on a characteristic of the at least one repeating feature.

In Example 26, the subject matter of Example 25 may include wherein the characteristic is based on a time period between the repeating features.

In Example 27, the subject matter of Example 26 may include wherein the characteristic is a multiple of the time period, wherein the multiple is an integer greater than or equal to one.

In Example 28, the subject matter of Examples 25-27 may include wherein the communication signal is a Global Navigation Satellite System (GNSS) signal.

In Example 29, the subject matter of Example 28 may include the circuitry further configured to acquire the GNSS signal in a frequency domain and code domain.

In Example 30, the subject matter of Examples 28-29 may include wherein the GNSS signal is a Galileo satellite signal.

In Example 31, the subject matter of Example 30 may include wherein the Galileo satellite signal is an E1B signal.

In Example 32, the subject matter of Example 31 may include wherein the E1B signal comprises an Integrity Navigation Message (I/NAV).

In Example 33, the subject matter of Example 32 may include wherein the page synchronization pattern comprises a 10 bit sequence.

In Example 34, the subject matter of Example 33 may include wherein the 10 bit sequence is '0 1 0 1 1 0 0 0 0 0.'

In Example 35, the subject matter of Examples 25-34 may include the circuitry further configured to access the page synchronization pattern stored in a memory component.

In Example 36, the subject matter of Examples 25-35 may include wherein the pre-determined correlation condition is a correlation threshold.

In Example 37, the subject matter of Example 36 may include wherein the correlation threshold comprises a value indicating a high correlation with the page synchronization pattern.

In Example 38, the subject matter of Examples 25-37 may include the circuitry further configured to timestamp the detected subsets which meet the pre-determined correlation condition.

In Example 39, the subject matter of Example 38 may include the circuitry further configured to drive a free running counter by a real time clock.

In Example 40, the subject matter of Example 39 may include wherein the timestamping comprises marking the detected subsets with a corresponding value of the free running counter.

In Example 41, the subject matter of Examples 39-40 may include wherein the real time clock has a resolution smaller than a bit period of the page structure.

In Example 42, the subject matter of Example 41 may include wherein the resolution is smaller than about 4 milliseconds.

In Example 43, the subject matter of Examples 38-42 may include the circuitry further configured to collect the timestamps for a time period.

In Example 44, the subject matter of Example 43 may include wherein the time period is at least two seconds.

In Example 45, the subject matter of Examples 25-44 may include the circuitry further configured to inspect a polarity of the correlations of the two identified detected subsets.

In Example 46, the subject matter of Example 45 may include wherein when the polarity is negative, the circuitry further configured to apply a sign reversal to the raw symbol stream.

In Example 47, the subject matter of Examples 45-46 may include the circuitry further configured to de-interleave the raw symbol stream.

In Example 48, the subject matter of Example 47 may include the circuitry further configured to decode the de-interleaved symbol stream with a Viterbi decoder.

In Example 49, the subject matter of Examples 25-48 may include wherein the circuitry is configured in a signal processing component of a wireless communication device.

In Example 50, the subject matter of Example 49 may include wherein the signal processing component is a GNSS receiver.

In Example 51, a communication device configured to perform a page synchronization of a communication signal having a page structure with at least one repeating feature, the communication device including: a transceiver configured to receive signals; and a baseband processor, operatively coupled to the transceiver, and configured to: demodulate the communication signal to produce a raw symbol stream; correlate a plurality of subsets of the raw symbol stream with a page synchronization pattern; detect which of the plurality of subsets meet a pre-determined correlation condition; and identify two of the detected subsets based on a characteristic of the at least one repeating feature.

In Example 52, the subject matter of Example 51 may include wherein the characteristic is based on a time period between the repeating features.

In Example 53, the subject matter of Example 52 may include wherein the characteristic is a multiple of the time period, wherein the multiple is an integer greater than or equal to one.

In Example 54, the subject matter of Examples 51-53 may include wherein the communication signal is a Global Navigation Satellite System (GNSS) signal and the transceiver is a GNSS receiver.

In Example 55, the subject matter of Example 54 may include the baseband processor further configured to acquire the GNSS signal in a frequency domain and code domain.

In Example 56, the subject matter of Examples 54-55 may include wherein the GNSS signal is a Galileo satellite signal.

In Example 57, the subject matter of Example 56 may include wherein the Galileo satellite signal is an E1B signal.

In Example 58, the subject matter of Example 57 may include wherein the E1B signal comprises an Integrity Navigation Message (I/NAV).

In Example 59, the subject matter of Example 58 may include wherein the page synchronization pattern comprises a 10 bit sequence.

In Example 60, the subject matter of Example 59 may include wherein the 10 bit sequence is '0 1 0 1 1 0 0 0 0 0.'

In Example 61, the subject matter of Examples 51-60 may include the baseband processor further configured to access the page synchronization pattern stored in a memory component of the communication device.

In Example 62, the subject matter of Examples 51-61 may include wherein the pre-determined correlation condition is a correlation threshold.

In Example 63, the subject matter of Example 62 may include wherein the correlation threshold comprises a value indicating a high correlation with the page synchronization pattern.

In Example 64, the subject matter of Examples 51-63 may include the baseband processor further configured to timestamp the detected subsets which meet the pre-determined correlation condition.

In Example 65, the subject matter of Example 64 may include the baseband processor further configured to drive a free running counter by a real time clock.

In Example 66, the subject matter of Example 65 may include wherein the timestamping comprises marking the detected subsets with a corresponding value of the free running counter.

In Example 67, the subject matter of Examples 65-66 may include wherein the real time clock has a resolution smaller than a bit period of the page structure.

In Example 68, the subject matter of Example 67 may include wherein the resolution is smaller than about 4 milliseconds.

In Example 69, the subject matter of Examples 64-68 may include the baseband processor further configured to collect the timestamps for a time period.

In Example 70, the subject matter of Example 69 may include wherein the time period is at least two seconds.

In Example 71, the subject matter of Examples 51-70 may include the baseband processor further configured to inspect a polarity of the correlations of the two identified detected subsets.

In Example 72, the subject matter of Example 71 may include wherein when the polarity is negative, the baseband processor further configured to apply a sign reversal to the raw symbol stream.

In Example 73, the subject matter of Examples 71-72 may include the baseband processor further configured to de-interleave the raw symbol stream.

In Example 74, the subject matter of Example 73 may include the baseband processor further configured to decode the de-interleaved symbol stream with a Viterbi decoder.

In Example 75, a non-transitory computer readable medium with program instructions, which when executed by a processor of a communication device, cause the communication device to perform the method or realize a device of any one of the preceding or ensuing Examples.

In Example 76, a Global Navigation Satellite System (GNSS) signal processing component configured to perform a page synchronization of a GNSS signal, the GNSS signal processing component including: demodulation circuitry configured to demodulate the GNSS signal to produce a raw symbol stream; correlation circuitry configured to correlate a plurality of subsets of the raw symbol stream with a GNSS page synchronization pattern; detection circuitry configured to detect which of the plurality of subsets meet a pre-determined correlation condition; and identification circuitry configured to identify page boundaries of the GNSS signal based on the detected plurality of subsets meeting the pre-determined correlation condition and a pre-determined time condition.

In Example 77, the subject matter of Example 76 may include time marking circuitry configured to mark each of the detected subsets meeting the pre-determined correlation condition, wherein the marking of at least two of the detected subsets is used to determine the pre-determined time condition.

In Example 78, the subject matter of Example 77 may include the time marking circuitry configured with a free running counter with a real time clock.

In Example 74, the subject matter of Examples 76-78 may include wherein the pre-determined correlation condition is a correlation threshold.

In Example 80, the subject matter of Example 79 may include wherein the correlation threshold comprises a value indicating a high correlation with the page synchronization pattern.

In Example 81, the subject matter of Examples 76-80 may include a polarity inspector circuitry configured to inspect a polarity of the detected plurality of subsets meeting the pre-determined correlation condition and the pre-determined time condition.

In Example 82, the subject matter of Example 81 may include wherein when the polarity is negative, the polarity inspector circuitry configured to apply a sign reversal to the raw symbol stream.

In Example 83, the subject matter of Examples 81-82 may include de-interleaver circuitry configured to de-interleave the raw symbol stream.

In Example 84, the subject matter of Example 83 may include a Viterbi decoder configured to decode the de-interleaved raw symbol stream.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuitry for performing a page synchronization of a communication signal having a page structure with at least one repeating feature, the circuitry configured to:
    demodulate the communication signal to produce a raw symbol stream;
    correlate a plurality of subsets of the raw symbol stream with a page synchronization pattern;
    detect which of the plurality of subsets meet a pre-determined correlation condition; and
    identify two of the detected subsets based on a characteristic of the at least one repeating feature.

2. The circuitry of claim 1, wherein the characteristic is based on a time period between the repeating features.

3. The circuitry of claim 1, wherein the communication signal is a Galileo Global Navigation Satellite System (GNSS) signal.

4. The circuitry of claim 1, wherein the pre-determined correlation condition is a correlation threshold.

5. The circuitry of claim 4, wherein the correlation threshold comprises a value indicating a high correlation with the page synchronization pattern.

6. The circuitry of claim 1, the circuitry further configured to timestamp the detected subsets meeting the pre-determined correlation condition.

7. The circuitry of claim 6, the timestamping comprising marking the detected subsets with a corresponding value of a free running counter.

8. The circuitry of claim 1, the circuitry further configured to inspect a polarity of the correlations of the two identified detected subsets.

9. The circuitry of claim 8, wherein when the polarity is negative, the circuitry is further configured to apply a sign reversal to the raw symbol stream.

10. The circuitry of claim 1, wherein the at least one repeating feature defines one or more page boundaries of the page structure, wherein the two detected subsets identified based on the characteristic indicate the one or more page boundaries, and wherein the circuitry is configured to determine the page boundaries.

11. A Global Navigation Satellite System (GNSS) signal processing component configured to perform a page synchronization of a GNSS signal, the GNSS signal processing component comprising:
    a demodulator configured to demodulate the GNSS signal to produce a raw symbol stream;
    a correlator configured to correlate a plurality of subsets of the raw symbol stream with a GNSS page synchronization pattern;
    a marker configured to detect which of the plurality of subsets meet a pre-determined correlation condition; and
    a selector configured to identify page boundaries of the GNSS signal based on the detected plurality of subsets meeting the pre-determined correlation condition and a pre-determined time condition.

12. The GNSS signal processing component of claim 11, further comprising the timestamper configured to mark each of the detected subsets meeting the pre-determined correlation condition, wherein the marking of at least two of the detected subsets is used to determine the pre-determined time condition.

13. The GNSS signal processing component of claim 11, wherein the pre-determined correlation condition is a correlation threshold.

14. The GNSS signal processing component of claim 13, wherein the correlation threshold comprises a value indicating a high correlation with the page synchronization pattern.

15. The GNSS signal processing component of claim 11, further comprising a polarity inspector configured to inspect a polarity of the detected plurality of subsets meeting the pre-determined correlation condition and the pre-determined time condition.

16. The GNSS signal processing component of claim 15, wherein when the polarity is negative, the polarity inspector is configured to apply a sign reversal to the raw symbol stream.

17. A method for a communication device to perform a page synchronization of a communication signal having a page structure with at least one repeating feature, the method comprising:
- demodulating the communication signal to produce a raw symbol stream;
- correlating a plurality of subsets of the raw symbol stream with a page synchronization pattern;
- detecting which of the plurality of subsets meet a pre-determined correlation condition; and
- identifying two of the detected subsets based on a characteristic of the at least one repeating feature.

18. The method of claim 17, wherein the characteristic is based on a time period between the repeating features.

19. The method of claim 17, wherein the pre-determined correlation condition is a correlation threshold.

20. The method of claim 17, further comprising time-stamping the detected subsets which meet the pre-determined correlation condition.

21. The method of claim 17, further comprising inspecting a polarity of the correlations of the two identified detected subsets.

22. The method of claim 21, wherein when the polarity is negative, further comprising applying a sign reversal to the raw symbol stream.

23. A non-transitory computer readable medium with programmable instructions, which when executed by a processor of a communication device, cause the communication device to perform a page synchronization of a communication signal having a page structure with at least one repeating feature, the page synchronization comprising:
- demodulating the communication signal to produce a raw symbol stream;
- correlating a plurality of subsets of the raw symbol stream with a page synchronization pattern;
- detecting which of the plurality of subsets meet a pre-determined correlation condition; and
- identifying two of the detected subsets based on a characteristic of the at least one repeating feature.

24. The non-transitory computer readable medium of claim 23, the page synchronization further comprising time-stamping the detected subsets which meet the pre-determined correlation condition.

25. The non-transitory computer readable medium of claim 23, the page synchronization further comprising inspecting a polarity of the correlations of the two identified detected subsets.

* * * * *